United States Patent [19]

Ksiensyk et al.

[11] 3,902,604
[45] Sept. 2, 1975

[54] COUPLING ARRANGEMENT FOR LIGHT RAIL VEHICLES AND CABIN VEHICLES

[75] Inventors: Klaus Ksiensyk, Remscheid-Lennep; Barun Kumar Chatterjee, Remscheid, both of Germany

[73] Assignee: Bergische Stahl-Industrie, Remscheid, Germany

[22] Filed: Aug. 12, 1974

[21] Appl. No.: 496,909

[30] Foreign Application Priority Data
Aug. 14, 1973  Germany............................ 2341017

[52] U.S. Cl............. 213/75 R; 213/100 R; 280/508
[51] Int. Cl............................................. B61g 1/40
[58] Field of Search.......... 213/12, 20, 75 R, 100 R, 213/100 W; 280/504

[56] References Cited
UNITED STATES PATENTS

| | | |
|---|---|---|
| 1,610,902 | 12/1926 | Tomlinson...................... 280/510 X |
| 2,202,753 | 5/1940 | Bugatti.............................. 213/75 R |
| 2,248,005 | 7/1941 | Lyman................................. 280/510 |
| 2,949,194 | 8/1960 | Aspenberg..................... 213/75 R X |
| 3,809,002 | 5/1974 | Nagy et al..................... 213/75 R X |

Primary Examiner—M. Henson Wood, Jr.
Assistant Examiner—Gene A. Church
Attorney, Agent, or Firm—Walter Becker

[57] ABSTRACT

A coupling arrangement in which a mandrel on one vehicle is guided via a funnel into a socket on another vehicle. The mandrel is notched and a spring biased lock lever is engageable with the notch to lock the mandrel in the socket. The lever latches in release position and is automatically released by movement of the mandrel into the socket. The mandrel has a conical part connected thereto which seats on the mouth of the funnel and control line connections are made by separable elements carried by the respective coupling parts and which elements are interengaged when the coupling parts are coupled together.

10 Claims, 2 Drawing Figures

COUPLING ARRANGEMENT FOR LIGHT RAIL VEHICLES AND CABIN VEHICLES

The present invention relates to an automatic central buffer coupling for light rail vehicles and cabin vehicles etc., which are preferably employed in the traffic of devices. Such central buffer coupling comprises an A- and B- coupling respectively to be coupled in pairs while one coupling includes a mandrel and the other coupling includes a catching funnel contained in a guiding means for the mandrel.

The heretofore known central and central buffer couplings have been developed for rail vehicles and consequently require a number of parts and are heavy. Couplings of this type cannot be used for light rail vehicles or cabin vehicles which are used in connection with inner-city traffic. Therefore, new paths had to be explored in order on one hand to meet the various requirements of such vehicles with regard to connection, ability to be coupled, the transmission of forces, etc., and on the other hand to get by with as low a weight as possible. In this connection it is frequently even more important that the coupling itself requires as little space as possible because the question of space is at a premium. It is an object of the present invention to provide a coupling for light rail vehicles and cabin vehicles, which will meet all requirements and which nevertheless will have a simple design so that the liability to disorders will be kept to a minimum.

It is another object of this invention to provide a coupling as set forth in the preceding paragraph which not only has to meet the requirements now met by heretofore known central and central buffer couplings but on the other hand will be so small and light that it can be used for light rail vehicles and cabin vehicles.

These and other objects and advantages of the invention will appear more clearly from the following specifications in connection with the accompanying drawings, in which.

Figure 1:
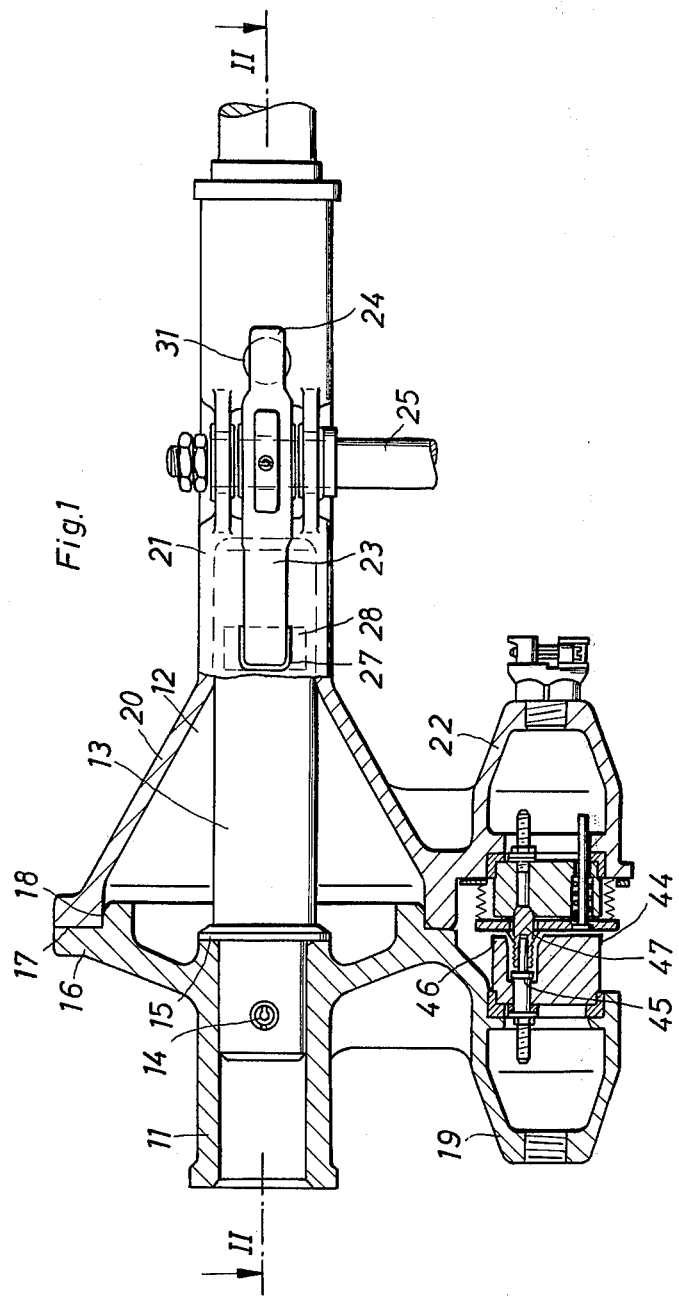
FIG. 1 is a side view of a coupling pair with the coupling head shown in section.

The automatic central buffer coupling according to the present invention is characterized primarily in that the mandrel has that portion thereof which is located in a guiding part provided with a notch engaged by a latch which is linked to the coupling and by means of a spring is pressed into closing position, said latch being held in its open position by arresting means which latter is adapted to be unlatched by a transfer lever actuated by the mandrel. It is advantageous in this connection to provide the latch with two arms and to arrange said latch on the coupling by means of a shaft extending transverse to the longitudinal axis of the coupling.

Expediently, the arresting device consists primarily of a spring-loaded pin which drops behind a nose on the latch and is adapted to be unlatched by means of a reversing lever one arm of which extends into the path of the mandrel.

Referring now to the drawings in detail, the coupling shown therein comprises two coupling sections, namely the A-coupling section 11 and the B-coupling section 12. The coupling section 11 is a cast piece which in the longitudinal axis of the coupling carries a mandrel 13 extending beyond the coupling plane toward the front. The mandrel 13 is connected in the coupling section 11 by means of a clamping sleeve 14 and has its flange 15 engage the corresponding abutment in the coupling housing of the coupling section 11. The coupling housing of coupling section 11 has a circularly widening portion 16 having provided thereon centering surfaces 17 located in the coupling plane, and also centering surfaces 18 coaxially arranged with said centering surfaces 17 and extending therebeyond. Cast onto the coupling 11 is furthermore in one piece the housing for the cable coupling 19.

The coupling section 12 comprises a catch funnel 20 which extends rearwardly into a guiding device 21 for the mandrel 13. Arranged at the front end of the funnel 20 are centering surfaces which cooperate with the centering surfaces 17, 18 of the coupling section 11. In addition thereto, the housing 22 for the cable coupling is cast onto the funnel 20.

Behind the guiding device 20 there is arranged on the coupling a latch comprising the two arms 23 and 24 with a shaft 25 extending transverse to the longitudinal axis of the coupling. The front arm 23 has a hood-shaped portion 26 which extends through a window 27 into the guiding device 21 and here is adapted to engage a notch 28 in the mandrel 13. The rear arm 24 of said latch is acted upon by a spring 29 through a pressure element 30 while the spring 29 is arranged in a bore 31 which extends through the cylindrical portion of the coupling. The spring is tensioned and held in its respective position by a nut 32.

The hub portion 33 of the latch is provided with an abutment 34 which cooperates with an arresting device for instance in the form of a pin 35. The pin 35 is pressed by spring 36 in the direction toward the abutment 34. The abutment 34 is together with the pin 35 so arranged on the latch part 33 that with the pin 35 engaging the abutment, the latch is open which means that the hood-shaped portion 26 does not extend into the guiding device 21 of the coupling. The latch is thus arrested in its open position. A reversing lever 38 is loosely linked to the outwardly located end of the pin 35 by means of pin 37 located in the transverse bores, said reversing lever 38 being pivotal about the shaft 39. The other arm 40 of this lever extends into the guiding device 21 into the path of the mandrel 13, and in coupled condition engages the front end face of the mandrel 13.

Screwed to selected portions of the part 16 of the clutch section 11 are centering pins 41 which are adapted to engage corresponding bores 42 in the widened portion of the funnel 20. The bores 42 may be reinforced by two resistant inserts 43. The front side of the cable coupling is closed by an elastic plate 44 while in front of each contact 45 there are provided openings 46 in the form of slots. Each coupling is in a manner known per se detachably connected to the coupling rod.

The drawing shows a coupling pair which can be uncoupled by pivoting the latch 33 about its shaft 25 in such a way that the hook portion 26 leaves the notch 28 of mandrel 13 whereby the mandres is no longer latched. When the mandrel is now returned in the direction counter to the arrow K, the reversing lever 38, 40 pivots about the shaft 39 under the influence of spring 36 until the pin 35 drops behind the abutment 34. In this position, the latch 33 is kept open and can no longer be pressed by spring 29 into closing position.

The clutch section 12 is now again ready for a coupling action.

Figure 2:
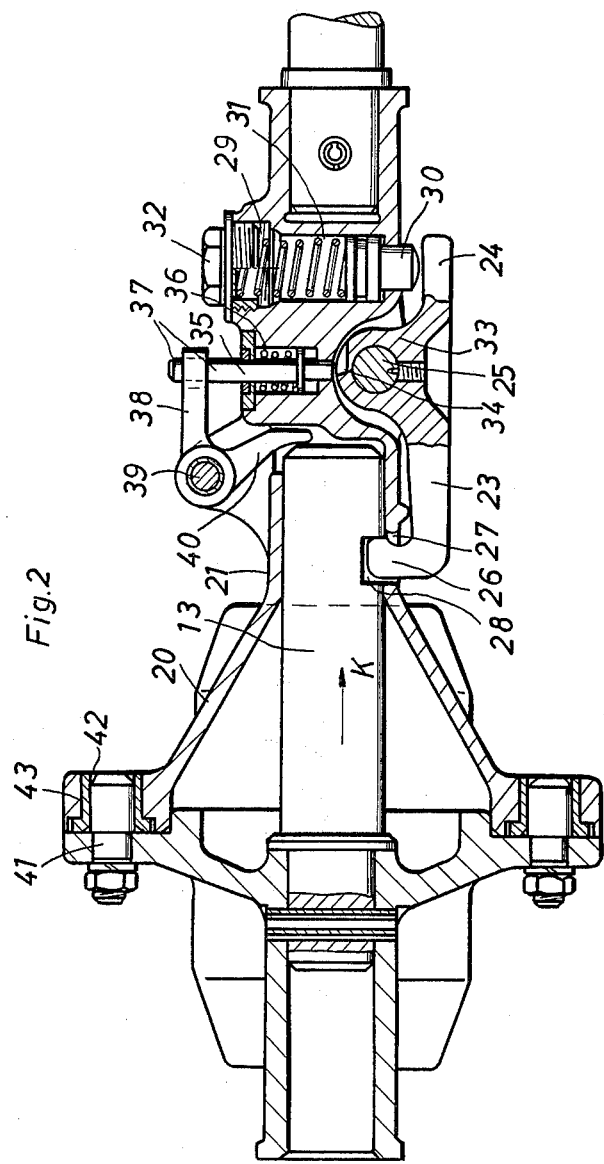
FIG. 2 represents a section taken along the line II—II of FIG. 1.

A coupling operation is effected in the reverse direction while when the two couplings move toward each other, the mandrel 13 is first caught by the funnel 20 and guided into the guiding device 21 in the direction of the arrow K. Shortly prior to reaching its end position, the front end of the mandrel 13 impacts upon the lever 24 and pivots the latter about the shaft 39 while the lever 38 moves the pin 35 against the thrust of spring 36. In this connection, the pin 35 frees the abutment 34 so that the spring 29 will be able through the intervention of the lever arm 24 to press the latch into its closing position. As a result thereof, the hook-shaped end 26 of arm 23 extends into the guiding device 21. When the mandrel 13 is then in the position shown in FIG. 2, the hook 26 drops into the notch 28 and latches the mandrel and thereby the two couplings. Shortly prior to reaching the end position, the centering pins 41 have moved into the openings 42 and here have effected a centering of the two coupling sections relative to each other. Furthermore, an additional centering has been effected between the two coupling sections at the concentric surfaces 18, and the two surfaces 17 of the coupling sections engage each other whereby a firm connection of the coupling sections is effected.

The cable couplings 22 have coupling inserts in which are provided plug contacts 45. Normally, the contacts 45 are closed by the plate 44 of rubber or the like. However, the contact parts 47 which protrude beyond the coupling plate are able to extend through the slotted part of the rubber plate 44 and to cooperate with the other contact 45. The advantage of this coupling is seen primarily in that with a coupling designed in the manner of an Albert coupling, a coupling has been created which consists of two different sections and which on one hand absolutely safely couples and in coupled condition can be safely arrested, whereas on the other hand all further functions such as keeping the clutch in disengaged condition, automatically unlatching after completed introduction of the mandrel and thereby established fixed connection of the two-coupling section will be made possible. With this clutch it is relatively simple to provide means for the coupling of the control continuances. Moreover, it is also possible to provide stationary or movable disengaging devices so that in this respect all requirements can be met which may occur in practice.

Furthermore, the coupling according to the invention is of a relatively simple and light construction while still permitting all required functions to be carried out in a reliable manner. Since the mandrel 13 is employed as separate part in the coupling section 11, it will be appreciated that in case of wear this particular part can easily be exchanged. Also, all other remaining parts are arranged in such a simple manner that the exchanging of parts is easy whenever it should become necessary. It is even possible to provide an additional safety device by providing the axle 21 for the latch horizontally so that when the spring 29 is broken, the weight of the pressure member 30 together with the lever arm 24 still presses the latch into closing position. In this way, it will be assured that even when the spring 29 breakes, the coupling cannot disengage itself.

The latch 23, 24 can be actuated by a lever through the intervention of an electric motor or through the intervention of an electromagnet depending on the requirements of the system in which the cabins or the railway vehicles move.

It is, of course, to be understood that the present invention is, by no means, limited to the specific showing in the drawings, but also comprises any modifications within the scope of the appended claims.

What is claimed is:

1. In a coupling device, especially for the coupling together of light rail vehicles and cabin vehicles and the like; a first coupling part adapted for mounting on the rearward end of a leading vehicle and a second part adapted for mounting on the forward end of a trailing vehicle, one coupling part having a coupling funnel opening toward the other part and terminating at the bottom in a socket, the other coupling part having a mandrel receivable in said socket, a lateral notch in the mandrel which is disposed in the socket when said coupling parts are coupled, a lock lever pivoted to said one coupling part having a nose receivable in said notch to lock the mandrel in the socket, a spring biasing said lever toward locking position, a latch engageable with said lever when the lever is moved to unlocking position to hold the lever in unlocking position, and means operated by movement of said mandrel into said socket for moving said latch into release position to permit said lock lever to be moved into locking position by said spring.

2. A coupling device according to claim 1 in which said lock lever is a two armed lever having said nose at the outer end of one arm while said spring acts on said lever near the outer end of the other arm, and a shaft extending transversely to the axis of the respective said coupling part and engaging the lever and coupling part to pivotally support the lever on the coupling part.

3. A coupling device according to claim 1 in which said one coupling part includes a bore therein, said spring being mounted in said bore and having an end engaging said lever.

4. A coupling device according to claim 2 in which said latch comprises a pin, said lever having an abutment surface thereon which moves past the end of the pin when the lever moves in unlocking direction, said pin being spring biased toward engagement with said abutment surface, and a lever member pivoted to said one coupling part having a first arm in the path of a mandrel entering said socket and a second arm engaging said pin.

5. A coupling device according to claim 1 in which said mandrel is detachably connected to the respective coupling part so as to be replaceable.

6. A coupling device according to claim 1 in which said other coupling part has a conical portion adapted to seat on the mouth of said funnel when the coupling parts are in coupled relation.

7. A coupling device according to claim 6 in which the mouth of said funnel and the rim of said conical portion are provided with cooperating pin and socket means.

8. A coupling device according to claim 1 in which each coupling part has a cable box connected thereto, the respective cable boxes axially aligning and abutting in end to end relation when the coupling parts are coupled together, said boxes adapted for supporting separable connector elements for control lines which operatively engage when the cable boxes are brought together.

9. A coupling device according to claim 8 in which the side of each cable box facing the other cable box has a plate of elastic material thereon, each plate being slotted for the respective separable connector element.

10. A coupling device according to claim 1 which includes remotely controlled power operable means on said one coupling part connected to said latch for actuation thereof.

* * * * *